United States Patent
Yang

(10) Patent No.: US 8,811,138 B2
(45) Date of Patent: Aug. 19, 2014

(54) EJECTING MODULE FOR HARD DISK DRIVES

(71) Applicants: Hong Fu Jin Precision Industry (ShenZhen) Co., Ltd., Shenzhen (CN); Hon Hai Precision Industry Co., Ltd., New Taipei (TW)

(72) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/781,671

(22) Filed: Feb. 28, 2013

(65) Prior Publication Data

US 2013/0250746 A1  Sep. 26, 2013

(30) Foreign Application Priority Data

Mar. 23, 2012 (CN) .......................... 2012 1 0079135

(51) Int. Cl.
*G11B 5/58* (2006.01)
(52) U.S. Cl.
USPC ....................................................... 369/53.42
(58) Field of Classification Search
None
See application file for complete search history.

(56) References Cited

U.S. PATENT DOCUMENTS

| 7,882,400 B2* | 2/2011 | Sato et al. ......................... 714/42 |
| 2007/0177290 A1* | 8/2007 | Suzuki et al. ................... 360/16 |
| 2013/0128383 A1* | 5/2013 | Wu et al. .......................... 360/79 |

FOREIGN PATENT DOCUMENTS

JP  10198527 A  *  7/1998  ............... G06F 3/06

* cited by examiner

*Primary Examiner* — Brenda Bernardi
(74) *Attorney, Agent, or Firm* — Novak Druce Connolly Bove + Quigg LLP

(57) ABSTRACT

An ejecting module is used in a server and includes a connector, a holder, a hard disk drive, a detecting circuit, a current output circuit, a first electromagnet and a second electromagnet. The hard disk drive is received in the holder. The detecting circuit detects whether the hard disk drive is electronically connected to the connector to output a control signal. The current output circuit receives the control signal and outputs a current. The first electromagnet is adjacent to the connector, and the second electromagnet faces the first electromagnet, the first electromagnet and the second electromagnet being electronically connected to the current output circuit. The current magnetizes the first electromagnet and the second electromagnet, a repulsion force is produced between the first electromagnet and the second electromagnet for moving the second electromagnet from the first electromagnet to be spaced from each other.

7 Claims, 4 Drawing Sheets

EJECTING MODULE FOR HARD DISK DRIVES

BACKGROUND

1. Technical Field

The disclosure generally relates to an ejecting module for separating hard disk drives from a printed circuit board.

2. Description of the Related Art

Servers have a plurality of hard disk drives placed in a cabinet. Each hard disk drive needs a holder to be carried in the server cabinet, and is electronically connected to a printed circuit board in the cabinet.

However, after a period of time, some of the hard disk drives might be damaged or problematic, and might not be electronically connected to the printed circuit board. A great deal of time is needed to find the problematic or damaged hard disk drives.

Therefore, there is room for improvement within the art.

BRIEF DESCRIPTION OF THE DRAWINGS

Many aspects of an exemplary ejecting module can be better understood with reference to the following drawings. The components in the drawings are not necessarily drawn to scale, the emphasis instead being placed upon clearly illustrating the principles of the exemplary ejecting mechanism. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
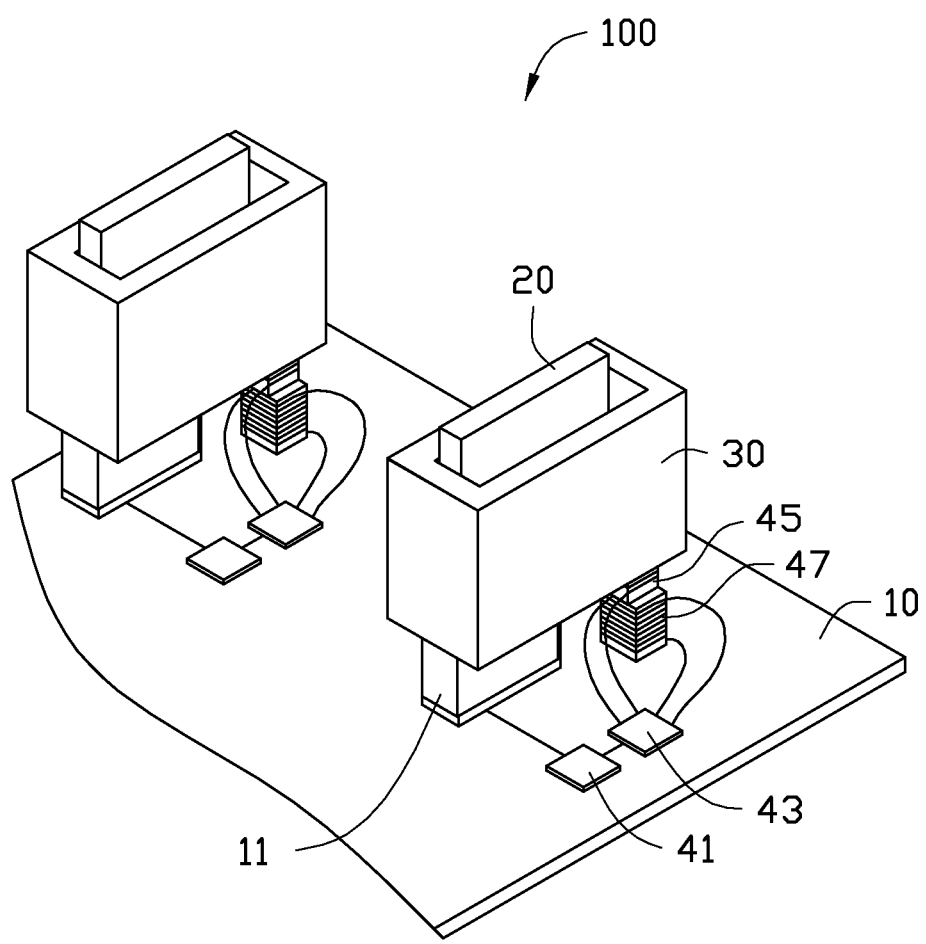
FIG. 1 is a schematic view of an ejecting mechanism used in a server according to a first exemplary embodiment.
Figure 2:
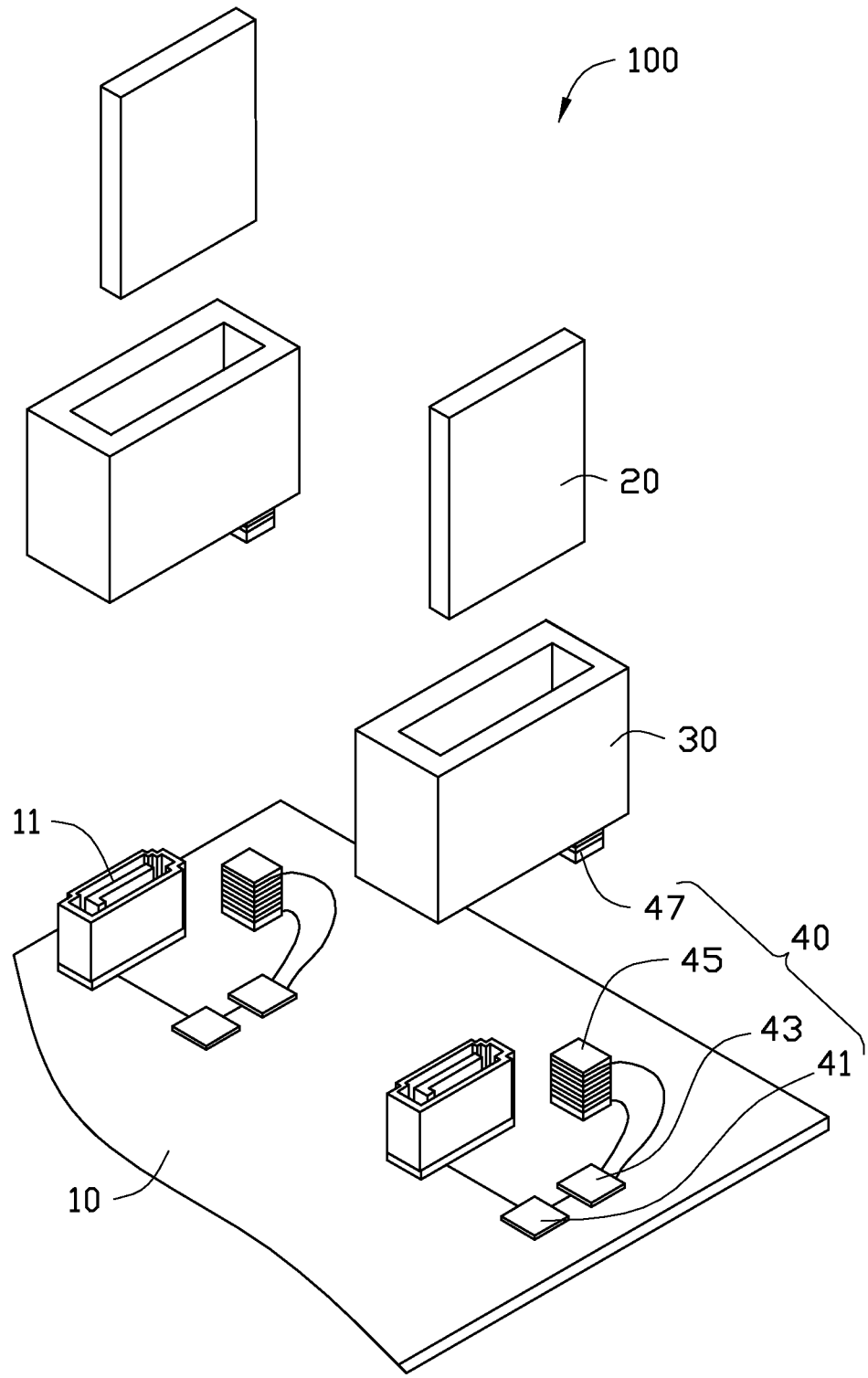
FIG. 2 is an exploded view of the ejecting mechanism.

FIGS. 1 to 2 show an exemplary embodiment of a server 100. The server 100 includes a printed circuit board 10, a plurality of hard disk drives 20, a plurality of holders 30 and a plurality of ejecting modules 40. Each hard disk drive 20 is placed in a corresponding holder 30. Each holder 30 is movably positioned in a housing (not shown) of the server 100. The printed circuit board 10 includes a plurality of connectors 11. When the hard disk drives 20 are respectively received in holders 30, the holders 30 can be moved to allow the hard disk drives 20 on the holders 30 become electronically connected to the connectors 11 on the printed circuit board 10. The ejecting modules 40 detect the connection between the hard disk drives 20 and the connectors 11. If any of the hard disk drives 20 is not electronically connected to a corresponding connector 11, the corresponding ejecting module 40 will separate the hard disk drive 20 with the holder 30 from a corresponding connector 11.

Each ejecting module 40 includes a detecting circuit 41, a current output circuit 43, a first electromagnet 45 and a second electromagnet 47. The detecting circuit 41 is located on the printed circuit board 10, and is electronically connected to a corresponding connector 11. The detecting circuit 41 can determine whether the hard disk drive 20 is electronically connected to the connector 11. If the detecting circuit 41 detects the hard disk drive 20 not electronically connected to the connector 11, the detecting circuit 41 will output a control signal. If the detecting circuit 41 detects the hard disk drive 20 at a normal state, the detecting circuit 41 has no response.

The current output circuit 43 is also located on the printed circuit board 10 and is electronically connected to the detecting circuit 41, for receiving the control signal. If the detecting circuit 41 output the control signal, the current output circuit 43 will receive the control signal, and output a current. If the current output circuit 43 is not received the control signal, the current output circuit 43 will do nothing.

Figure 3:
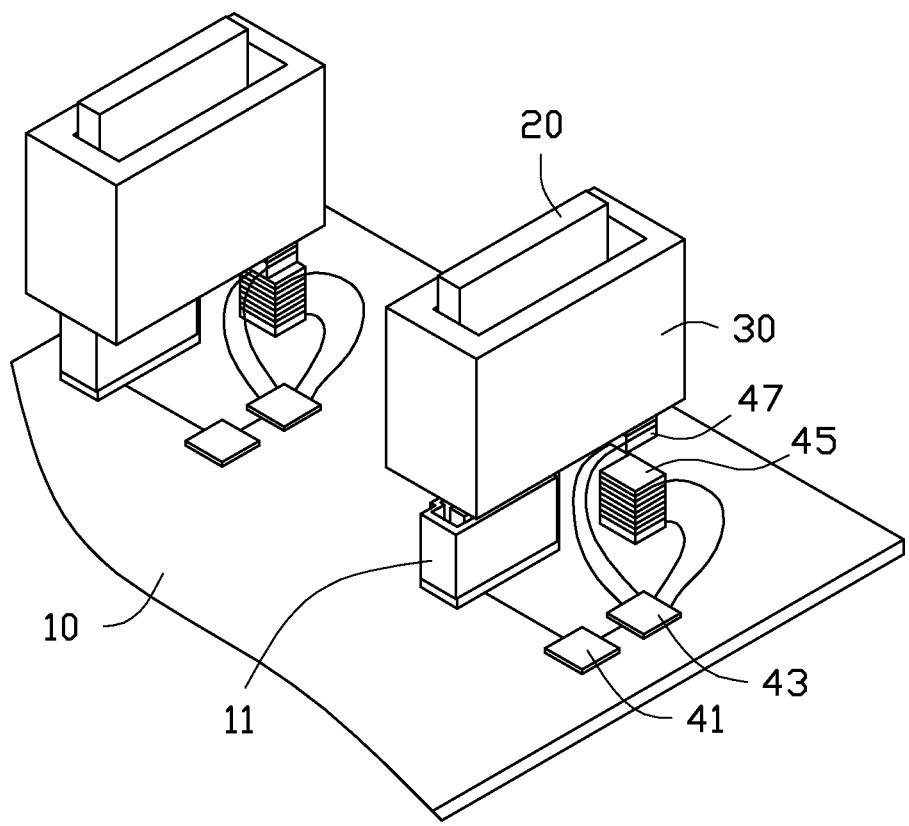
FIG. 3 is similar to FIG. 1, but showing the holder to be moved far away from the connector.

The first electromagnet 45 is located on the printed circuit board 10, and is adjacent to the connector 11. The second electromagnet 47 is located on the holder 30, and contacts the first electromagnet 45. The first electromagnet 45 and the second electromagnet 47 are electronically connected to the current output circuit 43. When the current output circuit 43 outputs a current, the first electromagnet 45 and the second electromagnet 47 will be magnetized to respectively have S pole and N pole. Opposite ends of the first electromagnet 45 and the second electromagnet 47 have the same poles, and a repulsion force is produced between the first electromagnet 45 and the second electromagnet 47. The repulsion force will move the second electromagnet 47 from the first electromagnet 45 to be spaced from each other. In this exemplary embodiment, the S pole of the first electromagnet 45 may face the S pole of the second electromagnet 47. Referring to FIG. 3, the repulsion force between the first electromagnet 45 and the second electromagnet 45 will separate the hard disk drive 20 from the connector 11, and move the holder 30 to extend from the server 100. Thus, the damaged or problematic hard disk drive 20 is easily identified. The operation is very convenient.

Figure 4:
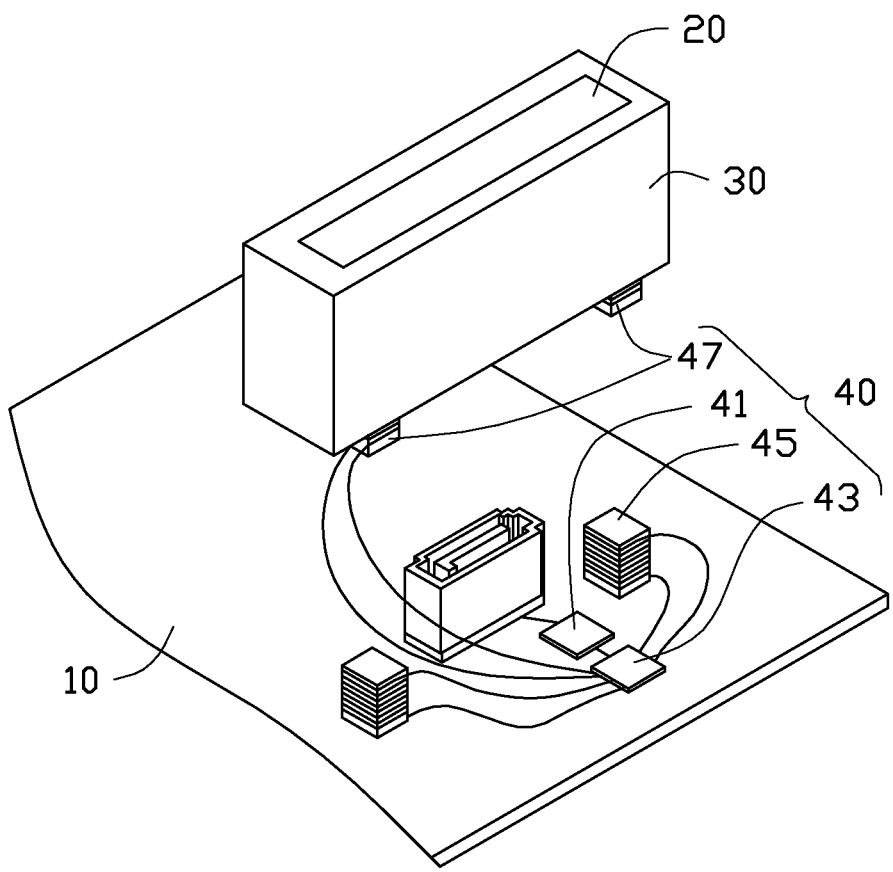
FIG. 4 is a schematic view of an ejecting mechanism used in a server according to a second exemplary embodiment.

FIG. 4 shows a second exemplary embodiment of the ejecting module 40. The ejecting module 40 includes two first electromagnets 45 and two second electromagnets 47. The two first electromagnets 45 are positioned at two sides of the connector 11. The second electromagnets 47 are positioned at two sides of the holder 30. The first electromagnets 45 face the second electromagnets 47. The repulsion force produced between the first electromagnets 45 and the second electromagnets 47 will move the second electromagnets 47 from the first electromagnets 45 to be spaced from each other. The second electromagnets 47 further move the holder 30 to extend from the server 100. The two first electromagnets 45 and two second electromagnets 47 can effectively secure a balance point of the holder 30, and will not tilt during movement.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. An ejecting module used in a server, the ejecting module comprising:
   a connector;
   a holder;
   a hard disk drive received in the holder;
   a detecting circuit for detecting whether the hard disk drive is electronically connected to the connector and outputting a control signal;
   a current output circuit for receiving the control signal and outputting a current; and a first electromagnet adjacent to the connector and a second electromagnet positioned at the holder and facing the first electromagnet, the first electromagnet and the second electromagnet being electronically connected to the current output circuit;

wherein when the current magnetizes the first electromagnet and the second electromagnet, a repulsion force is produced between the first electromagnet and the second electromagnet for driving the second electromagnet away from the first electromagnet.

2. The ejecting module as claimed in claim 1, further comprising a printed circuit board, wherein the detecting circuit is located on the printed circuit board and is electronically connected to a corresponding connector, the current output circuit is also located on the printed circuit board and is electronically connected to the detecting circuit, and the first electromagnet is located on the printed circuit board.

3. The ejecting module as claimed in claim 1, further comprising another first electromagnet and another second electromagnet, the two first electromagnets are positioned at two sides of the connector, the two second electromagnets are positioned at two sides of one end of the holder and face the two first electromagnets.

4. An ejecting module comprising:
a holder;
a hard disk drive received in the holder;
a detecting circuit for detecting the hard disk drive and outputting a control signal;
a current output circuit for receiving the control signal and outputting a current; and
a first electromagnet adjacent to the connector and a second electromagnet positioned at the holder and facing the first electromagnet, the first electromagnet and the second electromagnet being electronically connected to the current output circuit;

wherein when the current magnetizes the first electromagnet and the second electromagnet, a repulsion force is produced between the first electromagnet and the second electromagnet for driving the second electromagnet away from the first electromagnet.

5. The ejecting module as claimed in claim 4, further comprising a connector, wherein the hard disk drive is engaged with the connector, the detecting circuit detects whether the hard disk drive is electronically connected to the connector.

6. The ejecting module as claimed in claim 5, further comprising a printed circuit board and a connector, wherein the detecting circuit is located on the printed circuit board and is electronically connected to a corresponding connector, the current output circuit is also located on the printed circuit board and is electronically connected to the detecting circuit, and the first electromagnet is located on the printed circuit board.

7. The ejecting module as claimed in claim 5, further comprising another first electromagnet and another second electromagnet, the two first electromagnets are positioned at two sides of the connector, the two second electromagnets are positioned at two sides of one end of the holder and face the two first electromagnets.

* * * * *